(12) United States Patent
Furukawa et al.

(10) Patent No.: US 10,434,910 B2
(45) Date of Patent: Oct. 8, 2019

(54) SEAT CUSHION MEMBER

(71) Applicant: TOYOTA BOSHOKU KABUSHIKI KAISHA, Aichi (JP)

(72) Inventors: Kenji Furukawa, Aichi (JP); Teruyuki Shimizu, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/935,305

(22) Filed: Mar. 26, 2018

(65) Prior Publication Data

US 2018/0281646 A1    Oct. 4, 2018

(30) Foreign Application Priority Data

Apr. 3, 2017 (JP) ................... 2017-073623

(51) Int. Cl.
*B60N 2/70* (2006.01)
*B60N 2/68* (2006.01)

(52) U.S. Cl.
CPC ............. *B60N 2/70* (2013.01); *B60N 2/68* (2013.01)

(58) Field of Classification Search
CPC ...... B60N 2/70; B60N 2/7011; B60N 2/7005; B60N 2/7094; B60N 2/68
See application file for complete search history.

(56) References Cited

U.S. PATENT DOCUMENTS

| | | | |
|---|---|---|---|
| 2003/0062754 A1 | 4/2003 | Yamada | |
| 2009/0058159 A1 | 3/2009 | Okuda et al. | |
| 2010/0001560 A1* | 1/2010 | Gross | B60N 2/42763 297/216.1 |
| 2011/0074199 A1 | 3/2011 | Sprenger et al. | |
| 2014/0110988 A1 | 4/2014 | Nakanishi et al. | |
| 2015/0306998 A1* | 10/2015 | Matsui | B60N 2/68 297/452.52 |
| 2017/0066356 A1* | 3/2017 | Niwa | B60N 2/7094 |
| 2018/0272906 A1* | 9/2018 | Onuma | B60N 2/68 |

FOREIGN PATENT DOCUMENTS

| | | |
|---|---|---|
| DE | 10239057 | 4/2003 |
| DE | 102008038346 | 3/2009 |
| JP | 2002-262958 | 9/2002 |
| JP | 2009-523090 | 6/2009 |
| JP | 2011-084245 | 4/2011 |
| JP | 2014-162431 | 9/2014 |
| JP | 2014-171506 | 9/2014 |
| JP | 2016-117407 | 6/2016 |
| JP | 2017058950 | * 3/2017 |
| WO | 2007/082672 | 7/2007 |

OTHER PUBLICATIONS

Office Action issued in Germany Counterpart Patent Appl. No. 102018204307.8, dated Feb. 22, 2019, along with an English translation thereof.

* cited by examiner

*Primary Examiner* — Philip F Gabler
(74) *Attorney, Agent, or Firm* — Greenblum & Bernstein, P.L.C.

(57) ABSTRACT

Provided is a seat cushion member for use in a vehicle seat. The seat cushion member includes a cushion pad; a first side frame; a second side frame; at least one coupling member; and a load receiving member arranged in an area lower than the cushion pad and capable of receiving a downward load that acts on the cushion pad. The load receiving member is joined to the at least one coupling member and is spaced apart from the second side frame with a void therebetween.

9 Claims, 5 Drawing Sheets

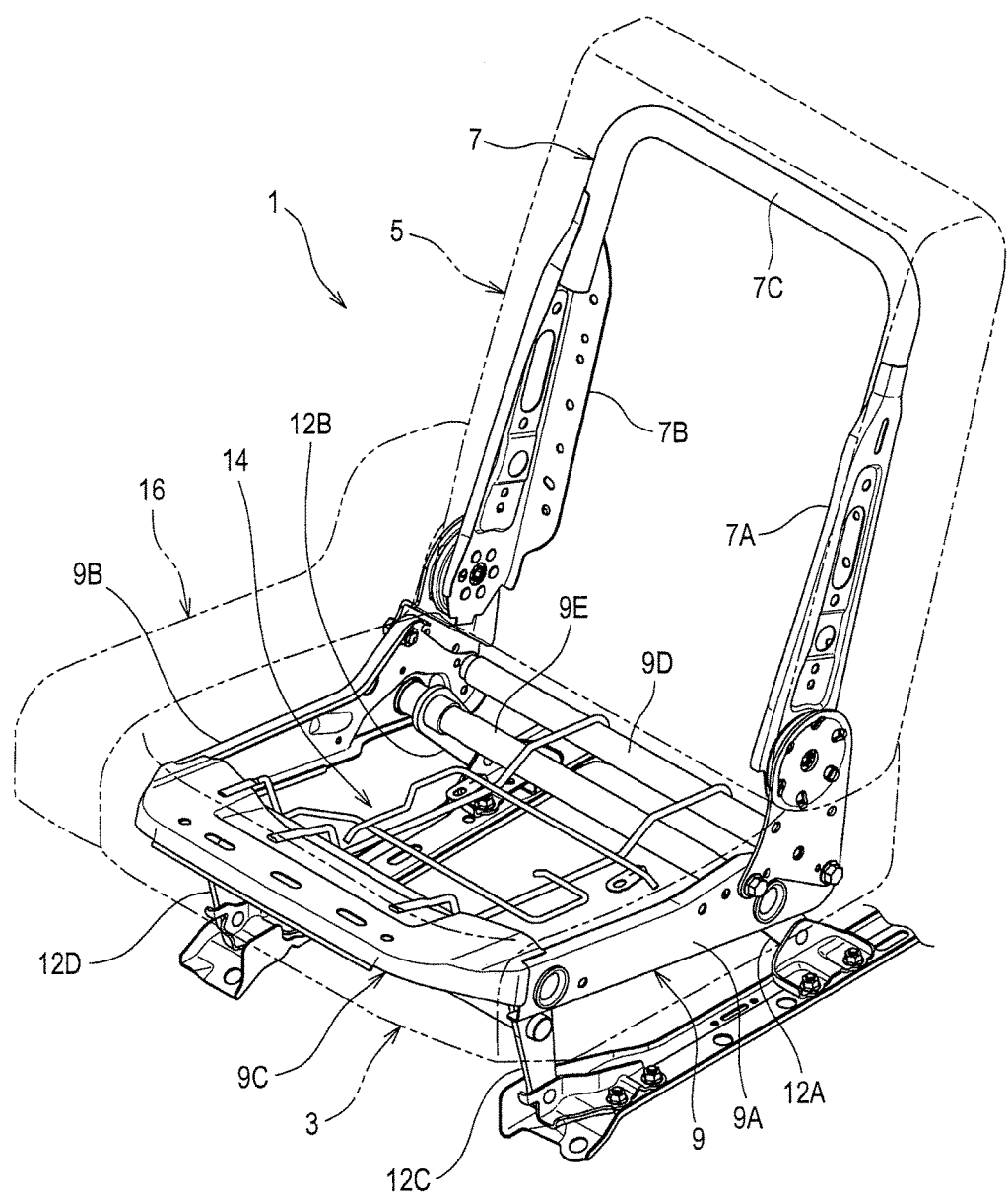
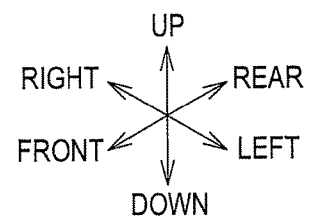
FIG. 1

SEAT CUSHION MEMBER

CROSS-REFERENCE TO RELATED APPLICATIONS

This application claims the benefit of Japanese Patent Application No. 2017-073623 filed on Apr. 3, 2017 with the Japan Patent Office, the entire disclosure of which is incorporated herein by reference.

BACKGROUND

The present disclosure relates to a seat cushion member for use in a vehicle seat.

A seat cushion member for use in a vehicle seat comprises a cushion frame, a cushion pad supported by the cushion frame, and so on.

For example, a cushion frame disclosed in Japanese Unexamined Patent Application Publication No. 2016-117407 (Patent Document 1) comprises two side frames extending along a seat front-rear axis and a load receiving member stretched between the side frames.

In the invention disclosed in Patent Document 1, the side frames are positioned immediately below a cushion pad. Thus, when an occupant, such as a passenger, sits on a seat cushion member, the cushion pad is compressively deformed by the occupant's own weight, whereby buttocks of the occupant get close to one of the side frames.

SUMMARY

In some types of vehicles, the center position of the downward load generated at sitting cannot help but get close to the side frame. In this case, the cushion pad on a side of the side frame is compressively deformed more greatly. This reduces a distance between the buttocks of the occupant and the side frame, which may give the occupant a feeling of discomfort.

In one aspect of the present disclosure, it is desirable to provide a seat cushion member capable of inhibiting a situation in which an occupant has a feeling of discomfort at sitting.

In the present disclosure, a seat cushion member for use in a vehicle seat comprises: a cushion pad; a first side frame located on a first side of the seat cushion member and extending along a front-rear axis; a second side frame located on a second side of the seat cushion member and extending along the front-rear axis, wherein the second side is opposite to the first side; at least one coupling member that couples the first side frame and the second side frame; and a load receiving member arranged in an area lower than the cushion pad and capable of receiving a downward load that acts on the cushion pad, the load receiving member being joined to the at least one coupling member and being spaced apart from the second side frame with a void therebetween.

Due to such a configuration, even when part of the cushion pad on a side of the second side frame is compressively deformed greatly in a downward direction, a distance between buttocks of an occupant and the second side frame is nearly unchanged in the present disclosure. This makes it possible to inhibit a situation in which the occupant has a feeling of discomfort at sitting.

The downward load that acts on the cushion pad at sitting is received at least by the at least one coupling member via the load receiving member. Since the at least one coupling member is coupled to the first side frame and the second side frame, the cushion pad can be supported reliably.

The present disclosure may be configured as below. It is desirable that the load receiving member comprise: at least one first wire of a rod shape extending substantially along the front-rear axis; and at least one second wire of a rod shape joined to the at least one first wire and extending substantially along the width axis. This makes it possible to support the cushion pad reliably. The at least one coupling member may comprise a front-side coupling member and a rear-side coupling member.

When the at least one second wire comprises: a front wire positioned on a front side; and a rear wire positioned substantially on a rear side with respect to the front wire, the following configuration is desirable.

A portion of the front wire positioned closer to the second side frame with respect to the at least one first wire is bent toward the front side, and a front side of the front wire is joined to the front-side coupling member.

A portion of the rear wire positioned closer to the second side frame with respect to the at least one first wire is bent toward the front side, and a front side of the rear wire is joined to the front wire. This makes it possible to support the cushion pad reliably.

It is desirable that a shield that covers the second side frame be provided in an area above the second side frame. This makes it possible to support the shield by the second side frame.

The at least one coupling member may comprise: a first coupling member provided on a front side of the seat cushion member; and a second coupling member provided on a rear side of the seat cushion member.

BRIEF DESCRIPTION OF THE DRAWINGS

An embodiment of the present disclosure will be described below with reference to the accompanying drawings, in which:

FIG. 1 is a schematic view of a vehicle seat according to the embodiment;

DETAILED DESCRIPTION OF THE PREFERRED EMBODIMENTS

Figure 2:
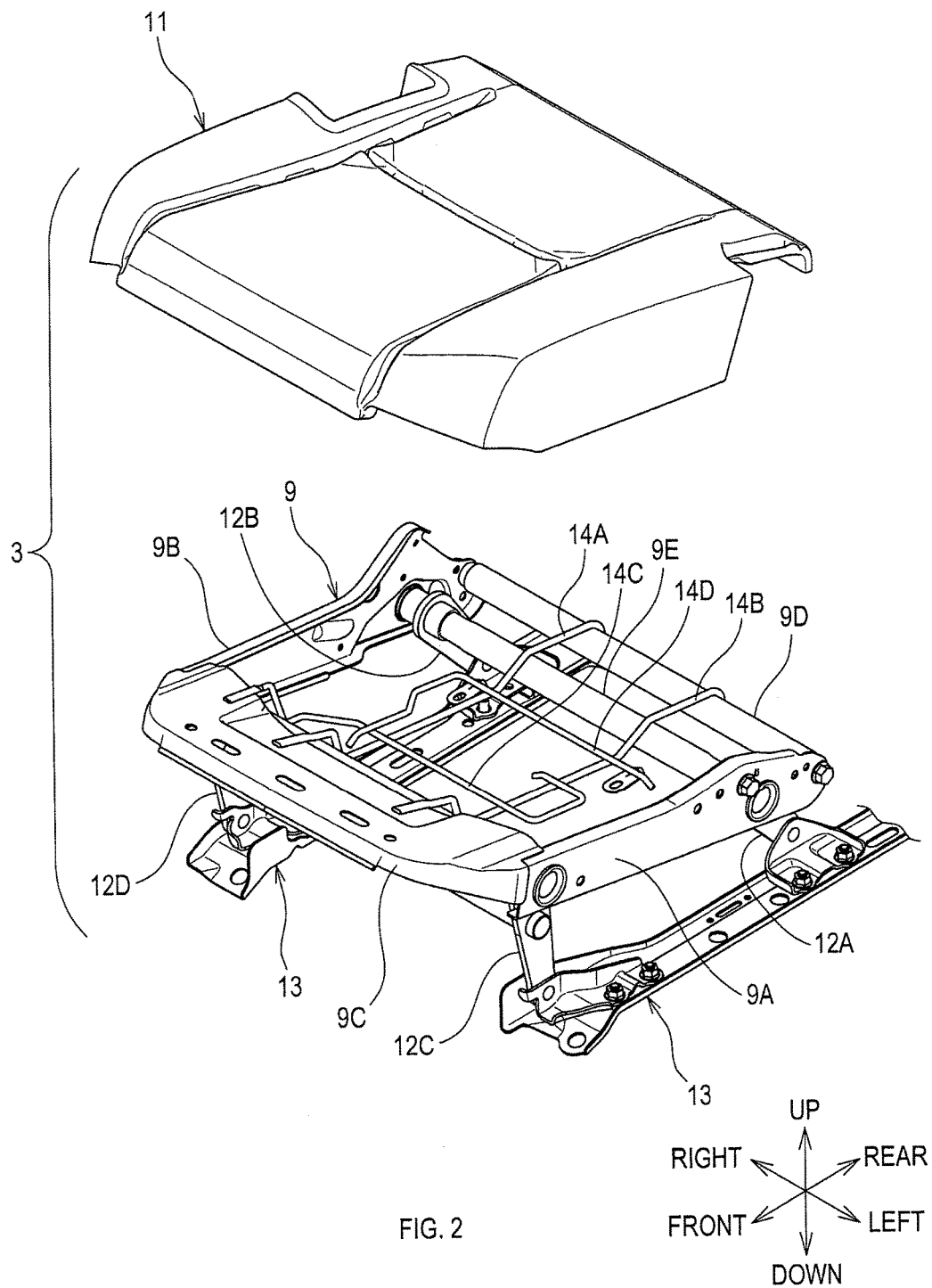
FIG. 2 is an exploded view of a seat cushion member according to the embodiment.

"Embodiments" to be described below are example embodiments within the technical scope of the present disclosure. Invention-specifying-matters and so on recited in the accompanying claims are not limited to specific configurations, structures, and the like, shown in the embodiments below.

Arrows indicating directions shown in the drawings are provided for easy understanding of mutual relationships between the drawings. The present disclosure is not limited by the directions shown in the drawings.

1. Overview of Vehicle Seat

A vehicle seat 1 of the present embodiment comprises a seat cushion member 3, a seatback 5, and so on. The vehicle seat 1 may be a rear seat of a passenger car.

The seatback 5 is a member to support a back of an occupant. A back frame 7 is a member that forms a framework of the seatback 5. The back frame 7 comprises side frames 7A and 7B, and an upper frame 7C.

The side frames 7A and 7B are respectively located on the left side and right side of the back frame 7, and extend substantially along an up-down axis. The upper frame 7C couples respective upper ends of the side frames 7A and 7B.

Respective lower ends of the side frames 7A and 7B (i.e., a lower end of the back frame 7) are coupled to a rear end of a cushion frame 9. The back frame 7 is pivotally coupled to the cushion frame 9.

2. Configuration of Seat Cushion Member 2.1 Overview of Seat Cushion Member

The seat cushion member 3 is a member to support buttocks of the occupant. As shown in FIG. 2, the seat cushion member 3 comprises the cushion frame 9 and a cushion pad 11.

The cushion frame 9 is a member that forms a framework of the seat cushion member 3. The cushion frame 9 comprises a first side frame 9A, a second side frame 9B, a first coupling member 9C, a second coupling member 9D, and a third coupling member 9E.

The first side frame 9A and the second side frame 9B are respectively provided to left side and a right side of the cushion frame 9, and extend along a seat front-rear axis (hereinafter simply referred to as a front-rear axis).

The first to third coupling members 9C to 9E extend along a seat width axis (hereinafter simply referred to as a width axis) and couple the first side frame 9A and the second side frame 9B. The first coupling member 9C couples the first side frame 9A and the second side frame 9B on a seat front end side.

The second coupling member 9D couples the first side frame 9A and the second side frame 9B on a seat rear end side. The first coupling member 9C is a panel-like member having a surface substantially perpendicular to the up-down axis. The second coupling member 9D is a tubular pipe member, and is located rearward of the third coupling member 9E.

The first side frame 9A, the second side frame 9B, the first coupling member 9C, and the second coupling member 9D are preferably made of metal. The first side frame 9A, the second side frame 9B, the first coupling member 9C, and the second coupling member 9D are preferably joined by welding. The third coupling member 9E couples the first side frame 9A and the second side frame 9B, and transmits a rotational force to lifter links 12A and 12B (see FIG. 1).

The lifter links 12A and 12B form, in cooperation with lifter links 12C and 12D, a quadric link mechanism (a four link mechanism) that causes the cushion frame 9, that is, the vehicle seat 1, to be displaced along the front-rear axis.

Respective upper ends of the lifter links 12A and 12B are pivotally coupled to the first side frame 9A and the second side frame 9B, respectively, on a seat rear side (hereinafter simply referred to as a rear side) of the cushion frame 9.

The lifter links 12C and 12D are pivotally coupled to the first side frame 9A and the second side frame 9B, respectively, on a seat front side (hereinafter simply referred to as a front side) of the cushion frame 9.

Figure 3:
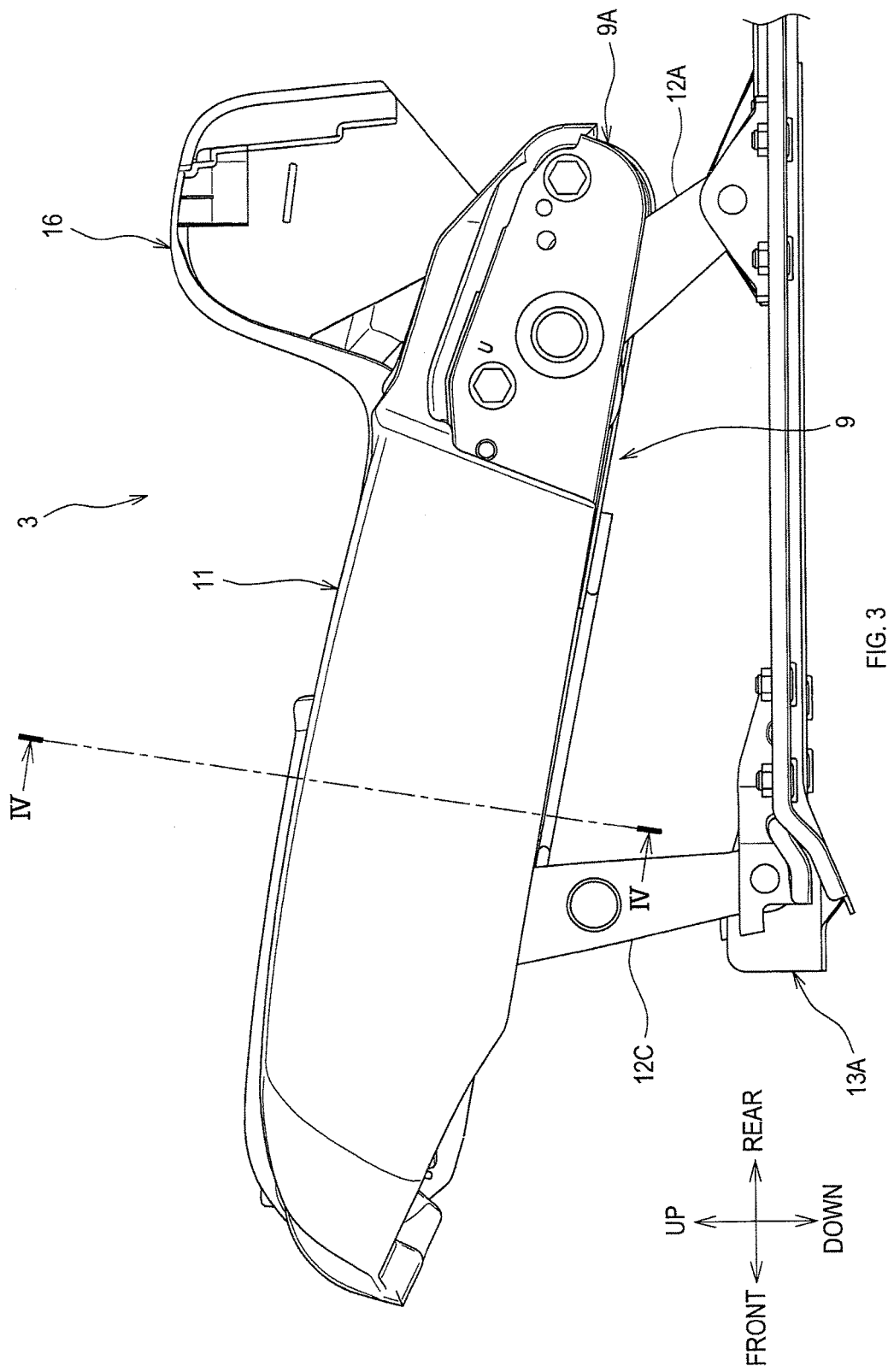
FIG. 3 is a side view of the seat cushion member according to the embodiment.

Respective lower ends of the lifter links 12A to 12D are pivotally coupled to a vehicle via base members 13A and 13B. In a seatable state shown in FIG. 3, the respective lifter links 12A to 12D are tilted with respect to the up-down axis such that the respective upper ends of the lifter links 12A to 12D are positioned on the front side with respect to the corresponding lower ends of the lifter links 12A to 12D.

When the third coupling member 9E is turned in a normal direction in the seatable state, the vehicle seat 1 is displaced rearward to enter a retracted state (also known as a storage state). When the third coupling member 9E is rotated in a reverse direction in the retracted state, the vehicle seat 1 is displaced forward to enter the seatable state.

2.2 Arrangement Configuration of Cushion Frame and Cushion Pad

The cushion pad 11 comprises a shock-absorbing member formed of foamed resin material or other materials, such as urethane foam, and is compressively deformed in an elastic manner when being subjected to a load. An upper surface of the cushion pad 11 is covered with leather, synthetic leather, or the like.

Figure 4:
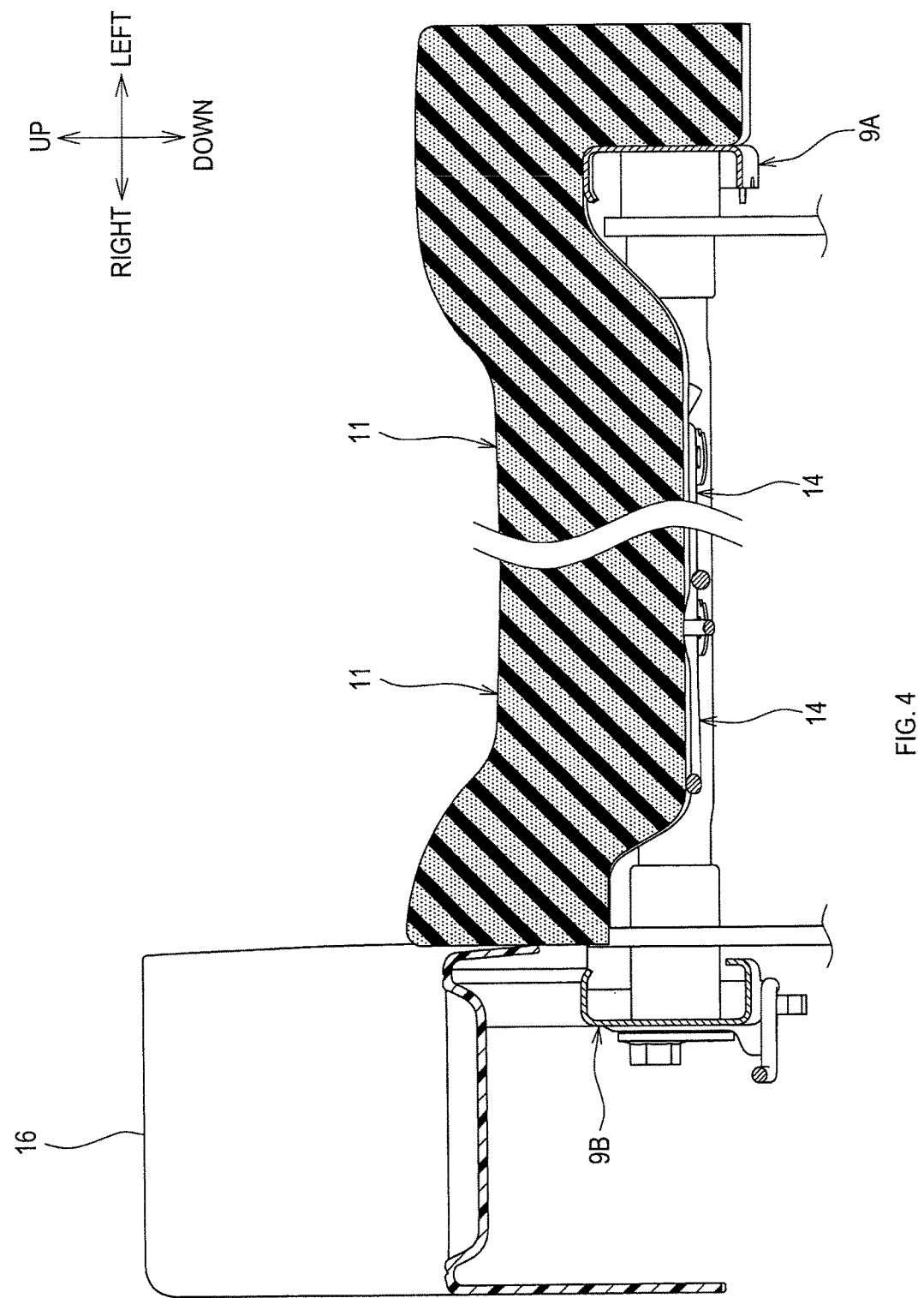
FIG. 4 is a sectional view taken along a line IV-IV in FIG. 3.
Figure 5:
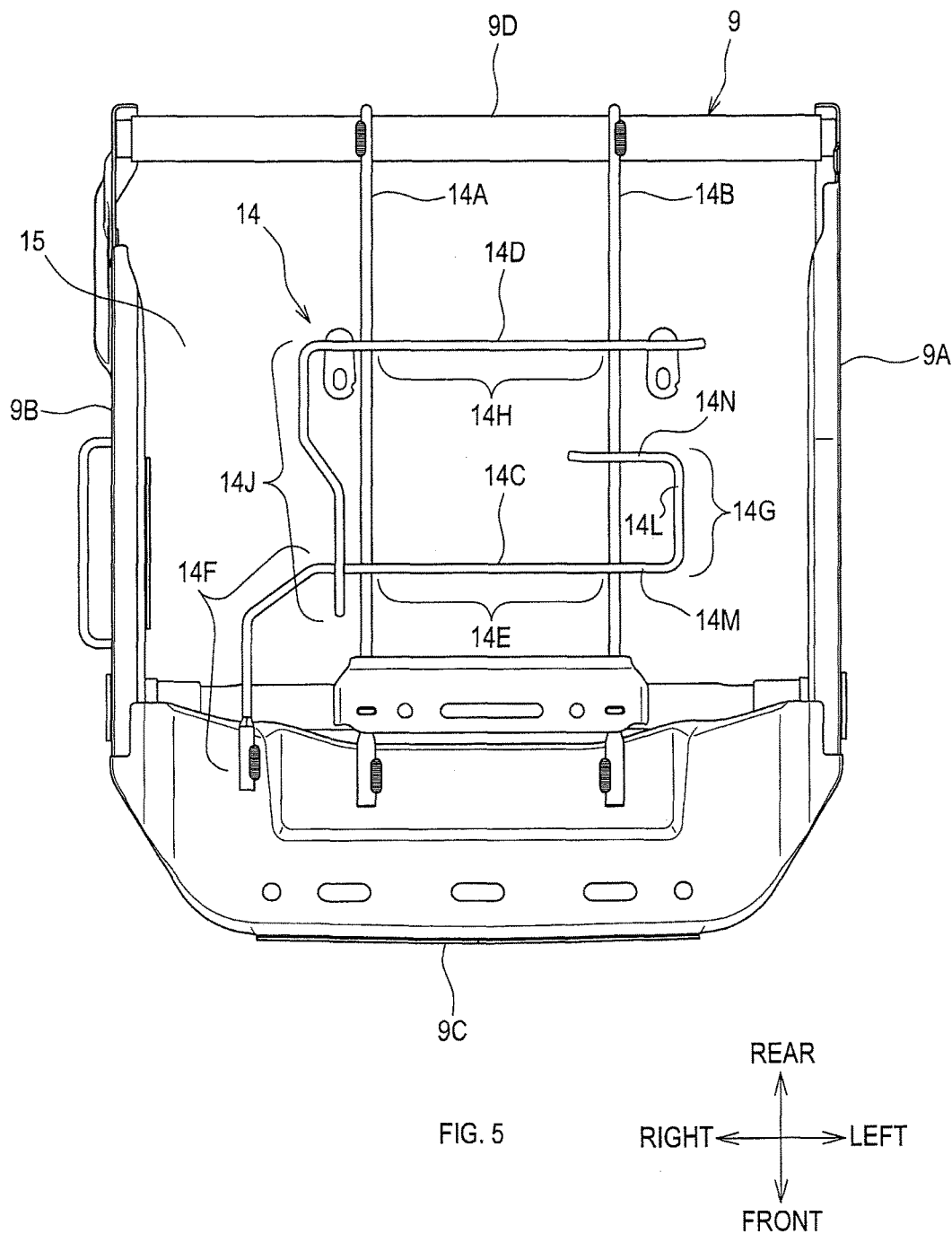
FIG. 5 is a top view of a cushion frame according to the embodiment.

As shown in FIG. 4, the cushion pad 11 is arranged on the cushion frame 9. As shown in FIG. 5, the cushion frame 9 comprises a load receiving member 14 located in a central area of the cushion frame 9. The load receiving member 14 is located in an area lower than the cushion pad 11 and is capable of receiving a downward load that acts on the cushion pad 11 (see FIG. 4).

As shown in FIG. 5, the load receiving member 14 is joined to the first coupling member 9C and the second coupling member 9D, and is spaced apart from the second side frame 9B with a void 15 therebetween. The load receiving member 14 comprises a right wire 14A, a left wire 14B, a front wire 14C, and a rear wire 14D. The right wire 14A and the left wire 14B correspond to one example of a first wire. The front wire 14C and the rear wire 14D correspond to one example of a second wire.

Each of the right wire 14A and the left wire 14B extends substantially along the front-rear axis and is preferably formed of a metal member having a solid round rod shape. The right wire 14A and the left wire 14B, which are spaced apart from each other, extend from the first coupling member 9C to the second coupling member 9D substantially parallel to each other.

Respective extending-direction front ends of the right wire 14A and the left wire 14B are preferably fixed to the first coupling member 9C by welding. Respective extending-direction rear ends of the right wire 14A and the left wire 14B are fixed to the second coupling member 9D by welding.

Each of the front wire 14C and the rear wire 14D extends partially along the width axis, is preferably formed of a metal member having a solid round rod shape and may be joined to the right wire 14A and the left wire 14B by welding. The front wire 14C is positioned mostly forward of the rear wire 14D.

The rear wire 14D is positioned on the rear side with respect to the second front wire 14C. The front wire 14C basically comprises a first portion 14E, a second portion 14F, and a third portion 14G.

The first portion 14E is stretched between the right wire 14A and the left wire 14B. The second portion 14F projects toward the second side frame 9B with respect to the right wire 14A.

The second portion 14F is bent toward the front side at a portion positioned closer to the second side frame 9B by a specified distance with respect to the right wire 14A. The front side of the second portion 14F is joined to the first coupling member 9C by welding.

The third portion 14G, which comprises three parts 14L, 14M, and 14N, is formed in a substantially C-like shape. A first part 14L extends along the front-rear axis. A second part 14M extends from an extending-direction front end of the first part 14L toward the left wire 14B. A third part 14N extends from an extending-direction rear end of the first part 14L toward the left wire 14B.

The rear wire 14D, which basically comprises two portions 14H and 14J, is formed in a substantially L-like shape. A first portion 14H is stretched between the right wire 14A and the left wire 14B.

A second portion 14J projects toward the second side frame 9B with respect to the right wire 14A. The second portion 14J is bent from the first portion 14H toward the front side. The front side of the second portion 14J may be joined to the front wire 14C by welding.

As shown in FIG. 4, the second side frame 9B is arranged in a position shifted with respect to the cushion pad 11 along the width axis, on the width-direction second end region. In other words, the second side frame 9B is positioned on a width-direction further right side with respect to a width-direction right end of the cushion pad 11.

A shield 16 is provided above the second side frame 9B. The shield 16 covers at least the second side frame 9B. The shield 16 comprises a storage portion (not shown) for accommodating an article such as a cup holder.

3. Features of Vehicle Seat (of Seat Cushion Member, in Particular) of the Present Embodiment The second side frame 9B is arranged in the position shifted along the width axis with respect to the cushion pad 11, in the width-direction second end region. The load receiving member 14 is joined to the first coupling member 9C and the second coupling member 9D, and is spaced apart from the second side frame 9B with the void 15 therebetween.

Due to such a configuration, even when part of the cushion pad 11 on a side of the second side frame 9B is compressively deformed greatly in a downward direction, a distance between the buttocks of the occupant and the second side frame 9B is nearly unchanged in the present embodiment. This makes it possible to inhibit a situation in which the occupant has a feeling of discomfort at sitting.

The downward load that acts on the cushion pad 11 at sitting is received at least by the first coupling member 9C and the second coupling member 9D via the load receiving member 14. Since the first coupling member 9C and the second coupling member 9D are each coupled to the first side frame 9A and the second side frame 9B, the cushion pad 11 can be supported reliably.

The load receiving member 14 comprises the right wire 14A and the left wire 14B, each having a rod shape and extending along the front-rear axis, and the front wire 14C and the rear wire 14D, each having a rod shape, joined to the right wire 14A and the left wire 14B, and extending along the width axis. This makes it possible to support the cushion pad 11 reliably.

The second portion 14F of the front wire 14C, which is positioned closer to the second side frame 9B with respect to the right wire 14A, is bent toward the front side, and the front side of the front wire 14C is joined to the first coupling member 9C.

The second portion 14J of the rear wire 14D, which is positioned closer to the second side frame 9B with respect to the right wire 14A, is bent toward the front side, and the front side of the rear wire 14D is joined to the front wire 14C. This makes it possible to support the cushion pad 11 reliably.

The shield 16 that covers the second side frame 9B is provided in an area above the second side frame 9B. This makes it possible to support the shield 16 by the second side frame 9B.

Other Embodiments

In the above-described embodiment, the second side frame 9B is arranged on the width-direction right end side of the cushion frame 9. However, the present disclosure is not limited to this. For example, the second side frame 9B may be arranged on a width-direction left end side of the cushion frame 9.

The load receiving member 14 of the above-described embodiment is configured with the wires 14A to 14D. However, the present disclosure is not limited to this. For example, the load receiving member 14 may be configured with a resin plate, a spring-like member, or the like.

In the above-described embodiment, the shield 16 is provided in the area upper than the second side frame 9B. However, the present disclosure is not limited to this. For example, a configuration without the shield 16 may be employed.

In the above-described embodiment, the rear seat of the passenger car is described as an example. However, the present disclosure is not limited to this. The present disclosure can also be applied to other automotive seats, or seats for use in other vehicles, such as railway vehicles, ships, and airplanes.

The present disclosure is not limited to the above-described embodiments as long as the present disclosure conforms to the gist of the disclosure recited in the appended claims. Thus, at least two of the above-described embodiments may be combined together.

What is claimed is:

1. A seat cushion member for use in a vehicle seat, the seat cushion member comprising:
    a cushion pad;
    a first side frame located on a first side of the seat cushion member and extending along a front-rear axis of the seat cushion member;
    a second side frame located on a second side of the seat cushion member and extending along the front-rear axis, wherein the second side is opposite to the first side;
    at least one coupling member that couples the first side frame and the second side frame; and
    a load receiving member arranged in an area lower than the cushion pad and configured to receive a downward load that acts on the cushion pad, the load receiving member being joined to the at least one coupling member and being spaced apart from the second side frame with a void therebetween,
    wherein the load receiving member comprises:
        at least one first wire of a rod shape extending substantially along the front-rear axis; and
        at least one second wire of a rod shape joined to the at least one first wire and extending substantially along a width axis of the seat cushion member, and
    wherein the at least one second wire comprises:
        a front wire positioned at a front side of the seat cushion member along the front-rear axis such that a front side of the front wire is joined to the at least one coupling member.

2. The seat cushion member according to claim 1,
    wherein the at least one coupling member comprises:
        a front-side coupling member; and
        a rear-side coupling member.

3. The seat cushion member according to claim 2,
    wherein the at least one second wire further comprises:
        a rear wire positioned substantially on a rear side with respect to the front wire,
    wherein a portion of the front wire positioned closer to the second side frame with respect to the at least one first wire is bent toward the front side of the seat cushion member such that the front side of the front wire is joined to the front-side coupling member, and
wherein a portion of the rear wire positioned closer to the second side frame with respect to the at least one first wire is bent toward the front side of the seat cushion member such that a front side of the rear wire is joined to the front wire.

4. The seat cushion member according to claim 2, wherein the front side of the front wire is joined to the front-side coupling member.

5. The seat cushion member according to claim 1, wherein a shield that covers the second side frame is provided in an area above the second side frame.

6. The seat cushion member according to claim 1, wherein the at least one coupling member comprises:
   a first coupling member provided on the front side of the seat cushion member; and
   a second coupling member provided on a rear side of the seat cushion member.

7. The seat cushion member according to claim 6, wherein the front side of the front wire is joined to the first coupling member.

8. The seat cushion member according to claim 1, wherein the second side frame is arranged at a position offset with respect to the cushion pad along the width axis of the seat cushion member.

9. The seat cushion member according to claim 1, wherein the at least one second wire further comprises:
   a rear wire positioned substantially on a rear side with respect to the front wire, and
wherein the front wire is closer than the rear wire to the second side frame along the width axis direction of the seat cushion member.

* * * * *